United States Patent
Dey et al.

(10) Patent No.: US 10,318,820 B2
(45) Date of Patent: *Jun. 11, 2019

(54) IMAGE PROCESSING TO IDENTIFY SELECTED INDIVIDUALS IN A FIELD OF VIEW

(71) Applicant: International Business Machines Corporation, Armonk, NY (US)

(72) Inventors: Kuntal Dey, New Delhi (IN); Seema Nagar, Bangalore (IN); Sudhanshu S. Singh, New Delhi (IN); Enara C. Vijil, Millwood, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,241

(22) Filed: Nov. 13, 2017

(65) Prior Publication Data

US 2018/0285652 A1  Oct. 4, 2018

Related U.S. Application Data

(63) Continuation of application No. 15/475,762, filed on Mar. 31, 2017.

(51) Int. Cl.
*H04N 5/232* (2006.01)
*G06K 9/00* (2006.01)
*G06F 3/0484* (2013.01)

(52) U.S. Cl.
CPC ..... *G06K 9/00771* (2013.01); *G06F 3/04842* (2013.01); *G06K 9/00677* (2013.01);
(Continued)

(58) Field of Classification Search
CPC ........... H04N 5/23212; H04N 5/23219; G06K 9/00771; G06K 9/00268; G06K 9/00288; G06F 3/04842
See application file for complete search history.

(56) References Cited

U.S. PATENT DOCUMENTS

| | | | |
|---|---|---|---|
| 2009/0128647 A1* | 5/2009 | Fahn | G01S 3/7865 348/221.1 |
| 2011/0038512 A1* | 2/2011 | Petrou | G06F 17/30256 382/118 |

(Continued)

OTHER PUBLICATIONS

K. Dey et al., "Image Processing to Identify Selected Individuals in a Field of View", U.S. Appl. No. 15/475,762, filed Mar. 31, 2017.

(Continued)

*Primary Examiner* — Joshua D Taylor
(74) *Attorney, Agent, or Firm* — Cantor Colburn LLP; Rahan Uddin

(57) ABSTRACT

A computer-implemented method for detecting and ranking individuals includes capturing live image data of a scene using an imaging device and identifying overlap between reference image data of the selected individuals and the live image data, wherein the overlap includes image data of the selected individuals in the scene. The method also includes capturing sets of image data of the selected individuals while the imaging device is in motion and recording the movement to provide a tracking record having instructions for positioning the imaging device where the imaging device captured the sets of image data of the selected individuals in the scene. The method further includes determining a score for each of the selected individuals in the scene based on a value related to an ability to view each friend and/or a social relationship value in order to enable a user to select who to aim the imaging device at.

10 Claims, 6 Drawing Sheets

(52) U.S. Cl.
CPC ..... *H04N 5/23212* (2013.01); *H04N 5/23219* (2013.01); *G06K 9/00268* (2013.01); *G06K 9/00288* (2013.01)

(56) References Cited

U.S. PATENT DOCUMENTS

| | | | |
|---|---|---|---|
| 2014/0064552 A1 | 3/2014 | Miyagi et al. | |
| 2014/0347501 A1* | 11/2014 | Ishida | H04N 5/23219 348/207.1 |
| 2016/0021293 A1* | 1/2016 | Jensen | H04N 5/23212 348/349 |
| 2016/0048723 A1 | 2/2016 | Jeong et al. | |
| 2017/0083748 A1* | 3/2017 | Zhou | G06T 7/248 |
| 2017/0364755 A1* | 12/2017 | Wu | G06K 9/00771 |
| 2018/0068173 A1 | 3/2018 | Kolleri | |

OTHER PUBLICATIONS

List of IBM Patents or Patent Applications Treated as Related; (Appendix P), Filed Nov. 13, 2017, 2 pages.

\* cited by examiner

IMAGE PROCESSING TO IDENTIFY SELECTED INDIVIDUALS IN A FIELD OF VIEW

DOMESTIC PRIORITY

The present application claims priority to U.S. non-provisional application Ser. No. 15/475,762, filed on Mar. 31, 2017, titled "IMAGE PROCESSING TO IDENTIFY SELECTED INDIVIDUALS IN A FIELD OF VIEW," assigned to the assignee hereof and expressly incorporated by reference herein.

BACKGROUND

The present invention relates in general to image data processing, and more specifically to systems, methods and computer program products for analyzing image data to identify and rank friends who are present within an imaging device's field of view. Even more specifically, the invention enables the imaging device to prioritize its focus on "better" friends by a joint function of a strength of their social relationships and an amount of visibility the imaging device has on the friend, which in turn depends on the device's imaging ability, ambient lighting conditions, crowd levels and physical distance between the friend and the person having the imaging device.

A face recognition system is a computer application capable of identifying or verifying a person from a digital image or a video frame from a video source. Social media/networking sites such as Facebook®, Twitter®, Flickr®, Google Plus®, and the like, include features that allow a person who uploads a photo to label or "tag" people depicted in the photo. For example, Facebook® includes functionality that allows users to locate a person who is present in a photo by clicking on the person's image in the photo and then typing a name of the person. Facebook® further offers functionality to auto-complete the name based on other existing Facebook® users. The user can repeat this process to locate and label each person within the photo. In this way, the user provides the standard input required for both face detection algorithms and face recognition algorithms. In general, face detection algorithms require an input of the number and location of faces present within an image, and face recognition algorithms require an input of the person label associated with each face object.

SUMMARY

Embodiments of the invention provide a computer-implemented method for detecting selected individuals. An example method includes accessing, using a processor of an imaging device, reference image data of the selected individuals and capturing, using the imaging device, live image data of a scene. The method also includes identifying, using the processor of the imaging device, overlap between the reference image data of the selected individuals and the live image data of the scene, wherein the overlap includes image data of the selected individuals in the scene. The method further includes capturing, using the imaging device, sets of image data of the selected individuals in the scene based at least in part on the live image data of the selected individuals in the scene, wherein capturing the sets of image data is performed while the imaging device is in motion. The method further includes capturing, using a movement sensor of the imaging device, movement data of the smart imaging device, wherein capturing the movement data is performed while the imaging device is capturing the sets of image data of the selected individuals in the scene. The method further includes generating, using the processor of the imaging device, a tracking record having instructions for positioning the image device where the image device captured the sets of image data of the selected individuals in the scene, based at least in part on the movement data and the sets of image data of the selected individuals in the scene. The method further includes determining a score for each of the selected individuals in the scene based on a value related to an ability to view each friend and/or a value related to a social relationship and providing an indication on a display of the imaging device that each of the selected individuals has been detected in accordance with a ranking of scores for the selected individuals. The method further includes providing movement instructions based on the tracking record to a user to move the imaging device in order to focus on one or more of the selected individuals in response to a selection by the user.

Embodiments of the invention provide a system for detecting selected individuals. An example system includes an imaging device and a processor and a memory. The processor and memory are configured to access reference image data of the selected individuals and capture, using the imaging device, live image data of a scene. The processor and memory are also configured to identify overlap between the reference image data of the selected individuals and the live image data of the scene, wherein the overlap includes image data of the selected individuals in the scene. The processor and memory are further configured to capture, using the imaging device, sets of image data of the selected individuals in the scene based at least in part on the live image data of the selected individuals in the scene, wherein capturing the sets of image data is performed while the imaging device is in motion. The processor and memory are further configured to capture, using a movement sensor of the imaging device, movement data of the smart imaging device, wherein capture of the movement data is performed while the imaging device is capturing the sets of image data of the selected individuals in the scene. The processor and memory are further configured to generate a tracking record having instructions for positioning the image device where the image device captured the sets of image data of the selected individuals in the scene, based at least in part on the movement data and the sets of image data of the selected individuals in the scene. The processor and memory are further configured to determine a score for each of the selected individuals in the scene based on a value related to an ability to view each friend and/or a value related to a social relationship and provide an indication on a display of the imaging device that each of the selected individuals has been detected in accordance with a ranking of scores for the selected individuals. The processor and memory are further configured to provide movement instructions based on the tracking record to a user to move the imaging device in order to focus on one or more of the selected individuals in response to a selection by the user.

Embodiments of the invention provide a computer program product for detecting selected individuals. An example computer program product includes a computer readable storage medium having program instructions embodied therewith. The program instructions are executable by a processor to cause the processor to access reference image data of the selected individuals and capture, using an imaging device, live image data of a scene. The program instructions also cause the processor to identify overlap between the reference image data of the selected individuals and the live image data of the scene, wherein the overlap includes image data of the selected individuals in the scene. The program instructions further cause the processor to capture, using the imaging device, sets of image data of the selected individuals in the scene based at least in part on the live image data of the selected individuals in the scene, wherein capturing the sets of image data is performed while the imaging device is in motion. The program instructions further cause the processor to capture, using a movement sensor of the imaging device, movement data of the smart imaging device, wherein capture of the movement data is performed while the movement sensor is capturing the sets of image data of the selected individuals in the scene. The program instructions further cause the processor to generate a tracking record including instructions for positioning the image device where the image device captured the sets of image data of the selected individuals in the scene, based at least in part on the movement data and the sets of image data of the selected individuals in the scene. The program instructions further cause the processor to determine a score for each of the selected individuals in the scene based on a value related to an ability to view each friend and/or a value related to a social relationship and provide an indication on a display of the imaging device that each of the selected individuals has been detected in accordance with a ranking of scores for the selected individuals. The program instructions further cause the processor to provide movement instructions based on the tracking record to a user to move the imaging device in order to focus on one or more of the selected individuals in response to a selection by the user.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

Figure 1A:
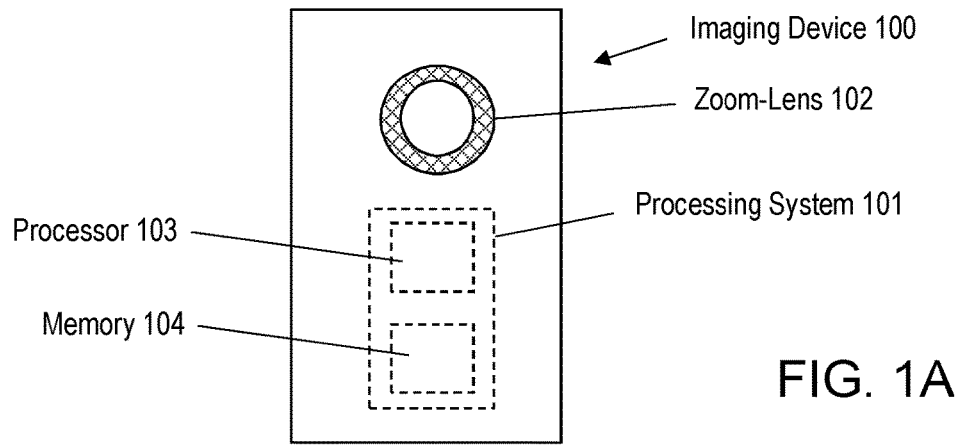
FIG. 1A depicts a back view of an imaging device according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Various embodiments of the invention are described with reference to the related drawings. Alternate embodiments can be devised without departing from the scope of the invention. It is noted that various connections are set forth between elements in the following description and in the drawings. These connections, unless specified otherwise, may be direct or indirect, and the present invention is not intended to be limited in this respect. Accordingly, a coupling of entities can refer to a direct or an indirect connection.

Additionally, although one or more embodiments of the invention are disclosed herein in connection with smart phones and/or smart cameras, the teachings in this specification are not limited to being implemented in smart phones and/or smart cameras, and can be applied to other object detection environments, now known or later developed.

It can be challenging to use the naked eye to visually recognize friends who are far away and/or in a large crowd. Embodiments of the invention provide methods, systems and computer program products that aid a user in visually finding friends who are far away and/or in a crowd. In some embodiments, the system can be embodied in a smart imaging device configured to direct the user on where to move the smart imaging device so that the device can focus on the detected friends. The detected friends are ranked according to a strength of social friendship and ease of being able to be spotted for example in order to provide the user with the option of who to view first.

Figure 1B:
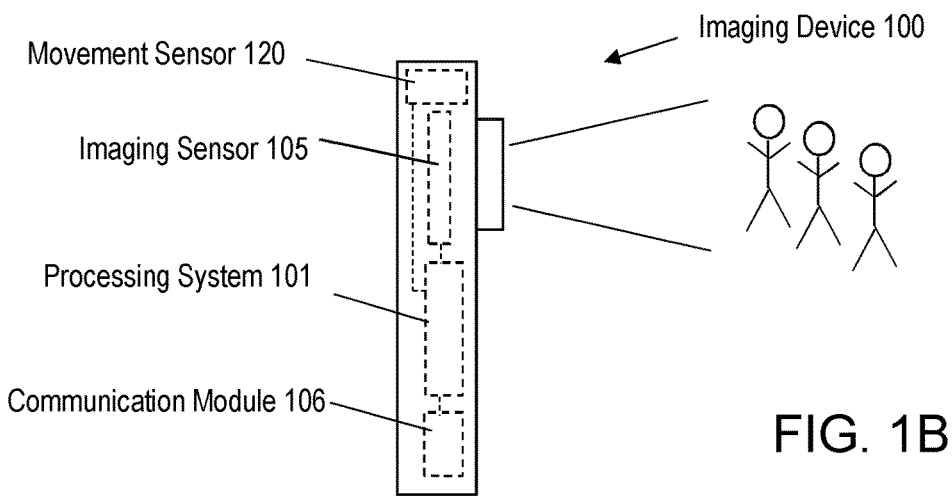
FIG. 1B depicts a side view of the imaging device shown in FIG. 1A.
Figure 1C:
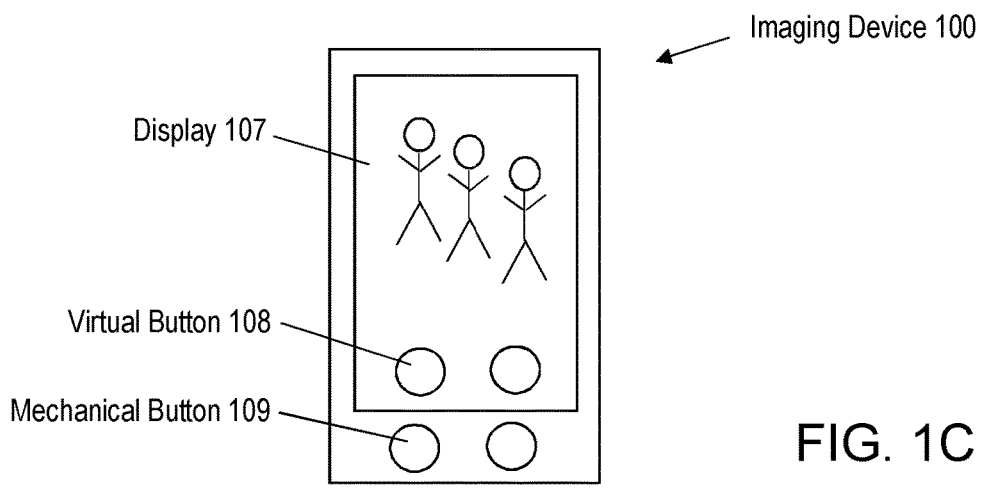
FIG. 1C depict a front view of the imaging device shown in FIG. 1A.

FIGS. 1A-1C depict aspects of an embodiment of an imaging device. FIG. 1A is a back view of an imaging device 100. The imaging device 100 includes a zoom-lens 102. The zoom-lens 102 is configured to be operated by a user and by a processing system 101 in the imaging device 100. The processing system 101 includes a processor 103 and a memory 104. The zoom-lens 102 can be a powered optical zoom-lens or it can be a digital zoom-lens. It can be appreciated that functions of the processing system 101 may be performed in a cloud computing environment discussed further below.

FIG. 1B is a side view of the imaging device 100. As illustrated in FIG. 1B, the imaging device 100 includes an imaging sensor 105. The imaging sensor 105 is configured to image a scene viewed by the powered-zoom lens 102 and convert the sensed scene into a digital file that can be processed by the processing system 101. The imaging device 100 further includes a communication module 106 that is configured to communicate wirelessly with a communications provider. In one or more embodiments, the communications provider can provide access to Internet web-sites, which can include for example social media web-sites. The imagining device 100 further includes a movement sensor 120 configured to sense movement of the imaging device 100 while imaging data (e.g., digital photographs) are being taken. In one or more embodiments, the movement sensor is an accelerometer, a gyroscope, and/or a magnetometer.

FIG. 1C is a front view of the imaging device 100. As illustrated in FIG. 1C, the imaging device 100 includes a display 107. In one or more embodiments the display 107 is a touch screen that can accept user inputs via virtual buttons 108 implemented by software. The smart imagining device 10 may include one or more mechanical input buttons 109. A virtual button 108 and/or a mechanical input button 109 can be configured to activate a feature in the imaging device 100 that aids the user in detecting or identifying or spotting friends. Non-limiting embodiments of the imaging device 100 include a smart phone having a camera, a smart tablet having a camera, and a smart mobile device having a camera. The term "smart" relates to the device having a processing system that generally includes a processor and memory for executing program instructions that include operation of the camera and a device display and also wireless communication capability for communicating with web-sites and/or a cloud computing environment.

Figure 2:
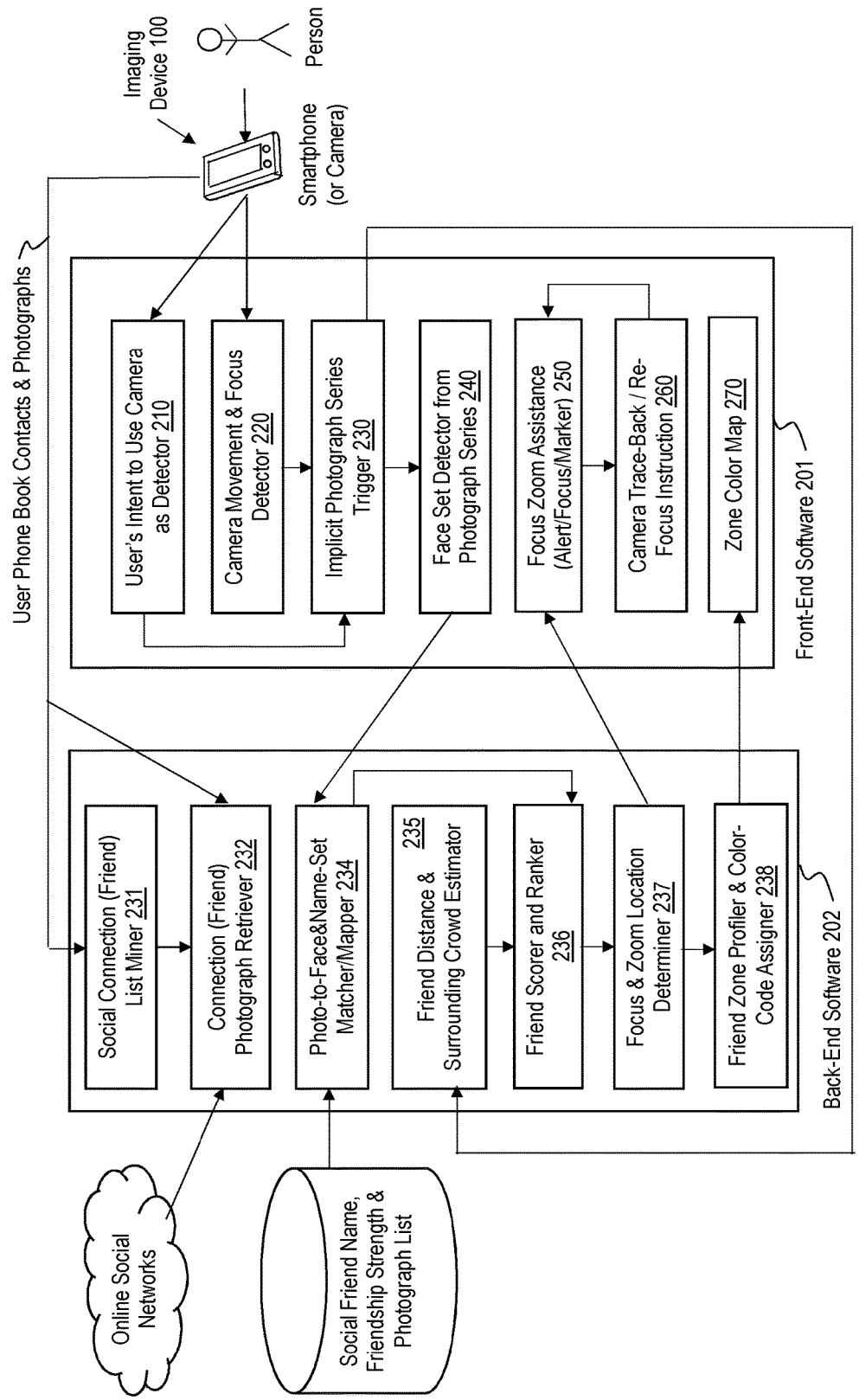
FIG. 2 depicts a diagram of an example system architecture of the imaging device shown in FIGS. 1A-1C, wherein the example system architecture is configured to implement a method for detecting friends within a field of view of the smart imaging device according to embodiments of the invention.

FIG. 2 is a schematic diagram depicting aspects of an embodiment of architecture of a system 200 for detecting friends with the imaging device 100. In the embodiment of FIG. 2, the system 200 is implemented using front-end software 201 and back-end software 202. The front-end software 201 can reside within the imaging device 100, while the back-end software 202 or portions of the back-end software 202 may reside in the imaging device 100 and/or an external device such as in a computing cloud in a non-limiting embodiment.

Discussing the front-end software 201 first, block 210 represents inputting the user's intent to activate the smart imaging device 10 as a friend detector or finder. Block 220 represents recording imaging device movement and focus settings used in taking live image data. Imaging device movement can be sensed using the movement sensor 120. Block 230 represents automatically taking a series of digital images in response to detecting a face of a friend in the live image data. Block 240 represents detecting faces of friends in the series of images. Block 250 represents providing focus and/or zoom assistance based on information received from the back-end software 202. In one or more embodiments, the focus and/or zoom assistance provides assistance in achieving the proper focus and/or zoom settings used for detecting the face or faces of friends in the series of images. This block may also include providing an alert signal to the user that one or more friends have be detected. This block may also include providing a marker on the display of the imaging device identifying one of the friends that has the highest ranking based on a strength of social friendship and ease of being able to be spotted as non-limiting examples. In one or more embodiments, the marker is a box surrounding the face of the friend where lines of the box have a specific identifiable color such as red for example. Block 260 represents providing instructions to the user to move the imaging device in a certain direction to trace back movement to a location of the smart imaging device to where one of the photographs was taken in which the friend was identified. This block also includes automatically providing focus and/or zoom in order to provide a real time image of the friend on the display. Block 270 represents providing a zone color map on the display. In one or more embodiments, the color zone map uses different colors to identify different crowd zones where each crowd zone has a separate location and a friend count and/or friend density as determined from the series of photographs. The block uses spatial image reconstruction techniques to estimate locations of the zones and superimpose on the zones the friend count and/or the friend density. This block may receive information from the back-end software 202 for constructing the zone color map.

Discussing now the back-end software 202, block 231 represents obtaining a list of friends by mining data from online social networks. Alternatively or in addition, the user can enter a list of friends. Block 232 represents obtaining image data such as a photograph corresponding to each friend on the list of friends by mining image data or photographs from the online social networks. Alternatively or in addition, the user can enter a data file having a photograph for each friend in the list of friends. This block can include determining a strength or magnitude of friendship with each of the friends. The strength or magnitude of friendship relates to how friendly the user is to the friend. For instance, determining if the friend a "good friend," a "best friend," or a "casual acquaintance." Key words such as "good friend" or "best friend" used in social media or a number of times the friend is mentioned in social media can be an indication of the strength of the friendship. Block 233 represents mapping each friend in the list of friends to a photograph of a face of that friend. This block can also include providing a friend data base having names of friends, a corresponding facial photograph of each friend, and a corresponding strength or magnitude of friendship for each friend. Block 234 represents estimating a physical distance to a friend detected in the series of photographs and/or a density of a crowd surrounding the detected friend. The physical distance can be estimated from focus data used to take the image data or photograph of the detected friend. The crowd density can be estimated from a total number of faces detected divided by an estimated area size in which the faces were detected. The area size can be estimated from a field of view of the lens taking the image data or photograph and the corresponding focus data that provides a distance. Block 235 represents providing a score for each detected friend and ranking the scores. In one or more embodiments, the scoring is based on technical ease of seeing the friend based on the technical data used to take the photograph of the friend, the distance to the friend from the user, and the strength of the friendship. The technical ease in seeing the detected friend, the closer the distance, and the stronger the strength of the friendship will each individually increase the score. In one or more embodiments, a value is assigned for each scoring category and the values are then summed to give a final score. Other scoring algorithms may also be used such as assigning a weight factor to each scoring category based on importance to the user. Block 236 represents determining the focus point and zoom setting for the highest ranked friend using the score ranking of the detected friends. If only one friend is detected than that friend will have the highest ranking by default. The focus point and zoom setting data can be provided to block 250 in the front-end software 201. Block 237 represents profiling each zone or surrounding area where a friend was detected and assigning a color code for that zone. The color code can correspond to the ranking for the corresponding detected friend. This information can be provided to block 270 in the front-end software 201.

One example of a workflow outline is now presented.

A. On-demand (reactively), or in-advance (proactively), the imaging device will look up or mine a list of social friends of the owner or imaging device user (using the owner's permission to access their social networking applications such as WhatsApp, Facebook®, Twitter®, Instagram®, Flickr® etc.), their phone book, the image data of corresponding photographs stored on the phone/camera/Facebook® timeline etc.

B. In response to the friend detection feature being activated by the user, the front-end software 201 will cause the imaging device to capture live image data. In response to detecting a friend's face using the live image data obtained by the imaging sensor of the imaging device, the front-end software 201 will automatically click photos (i.e., obtain image data) as the user moves the imaging device around such as by pointing to areas that the user thinks the friends be will be in. The imaging device will automatically store photos having the faces of detected friends based on the list of social friends.

C. The faces are now matched against the set of faces that have been mined from the smart imaging device owner's social friend's set that have been gathered across the various sources. Names of the detected friends are also associated with the detected faces.

D. For all the faces that are found to match enough with the social friends, (a) current movement sensor readings of the smart imaging device such as accelerometer, gyroscope, magnetometer etc. are recorded, such that, a tracking record can be kept on how to retrace the camera focus where (the location that) the friend was spotted from where the camera moves subsequently, and (b) a score is computed as a function of the technical ease of focus (lighting condition, distance to the friend with respect to the smart imaging device's capabilities etc.), distance to the friend (how easy it is for the person to see the friend, irrespective of how hard it is for the camera to see), and strength of social friendship, such that the friends that are easier to "see", and more "interesting to see", receive higher score values.

E. The scores are arranged in ordered rank of goodness. That is, increased ease of technical viewing, shorter distance to friend, and higher strength of friendship each contribute to higher goodness ranking.

F. In order of rank, the identities (and locations, in an embodiment) of the spotted (seen) friends notified to the smart imaging device owner or user (about this match) via an alert (such as a pop-up on the camera/smartphone screen), as well as, in an embodiment, the names of the spotted friends are also shown to the camera owner on display of the imaging device.

G. Further, camera movement directions are provided, to reach back (or retrace imaging device movement) to the friends observed in the crowd, with directions for the "better" (more highly ranked) friends provided higher up or earlier.

H. In an embodiment, the crowd zone profiles are shown with different color coding's shown for zones of the gathering with different friend densities, using spatial image reconstruction techniques to estimate the locations, and superimpose using the observation make regarding which part of the venue has how much friend count/density (as observed during the automatic photograph clicking phase).

One scenario employing an embodiment of a work flow is presented on using the smart imaging device with the front-end software and the back-end software to detect friends in a crowd.

(1) User is attempting to find his two tennis-loving friends in the Davis Cup stadium crowd as they called him and said—"I am in the west stand middle high up" and "I am on one of the front rows of the north east corner seats."

(2) User first focuses his smart imaging device (e.g., smart phone camera towards the west stand middle, zooms to the extent that he is comfortable (but not necessarily too close, as practically the view will still not be too clear but at the fine-grained focus and the inherent physiological movement/shaking/instability of the human hand will keep moving the focus with lesser control in higher zooms) and starts moving his or her camera.

(3) The smart camera/smartphone obtains live image data of the people in focus in response to activation by the User, and uses the back-end software to "recognize" or detect the friends in the live image data by looking at the User's social network friends list and other photos where User was tagged such as photos on his or her smartphone/camera that are tagged with friends etc.

(4) While User moves his or her camera, the camera spots his friends Friend 1, Friend 2 and Friend 3, and notes that Friend 3 is sitting a bit far but in a relatively low-crowd area, Friend 1 is sitting rather nearby but in a crowded area, and Friend 2 is also sitting somewhat far and in a crowded area. The front-end software automatically causes the imaging device to capture a series of images in response to the back-end software detecting the friends using the live image data. Further, the front-end software records camera movement while the series of images is being captured.

(5) The system (i.e. imaging device and software) also understands, from the social network profiles, that User is a good friend of Friend 1 and Friend 2, and also a decent (but not so strong) friend of Friend 3.

(6) Further, Friend 1's sitting area is the brightest among the three, while Friend 2's and Friend 3's sitting areas are not so bright but are of comparable brightness with each other.

(7) User's camera screen lower right bottom notifies him or her with a bright and visible color that, his Friend 1 is close by (and provides the way or directions to move the camera if he were to bring Friend 1 into focus or view), and also indicates in a fade color on the upper left top of the screen that his Friend 3 is visible (and also provides the way to move the camera if he were to bring Friend 3 into the focus or view)

(8) The screen also shows a "more friends" pagination tab on the screen.

(9) User touches the pagination tab, and the system no longer shows Friend 1 or Friend 3 on the screen, but goes on to show that Friend 2 is also visible (and the way or directions to move the camera to focus on Friend 2).

(10) User moves the camera on the path indicated to view Friend 1.

(11) Friend 1 is brought into focus.

(12) The smart camera phone now identifies Friend 1's face and zooms onto the face.

(13) Also, the smart camera phone creates a zone map and displays a link to the zone map page that is locally hosted within the smart camera phone—the zone map indicates three zones where User has friends (a dark red zone where Friend 1 is sitting, a mid-red zone where Friend 3 is sitting and a light red zone where Friend 2 is sitting)—had there been more friends of User sitting in these or other zones, and were seen by the camera, then they would also be captured and displayed in appropriate colors.

Figure 3:
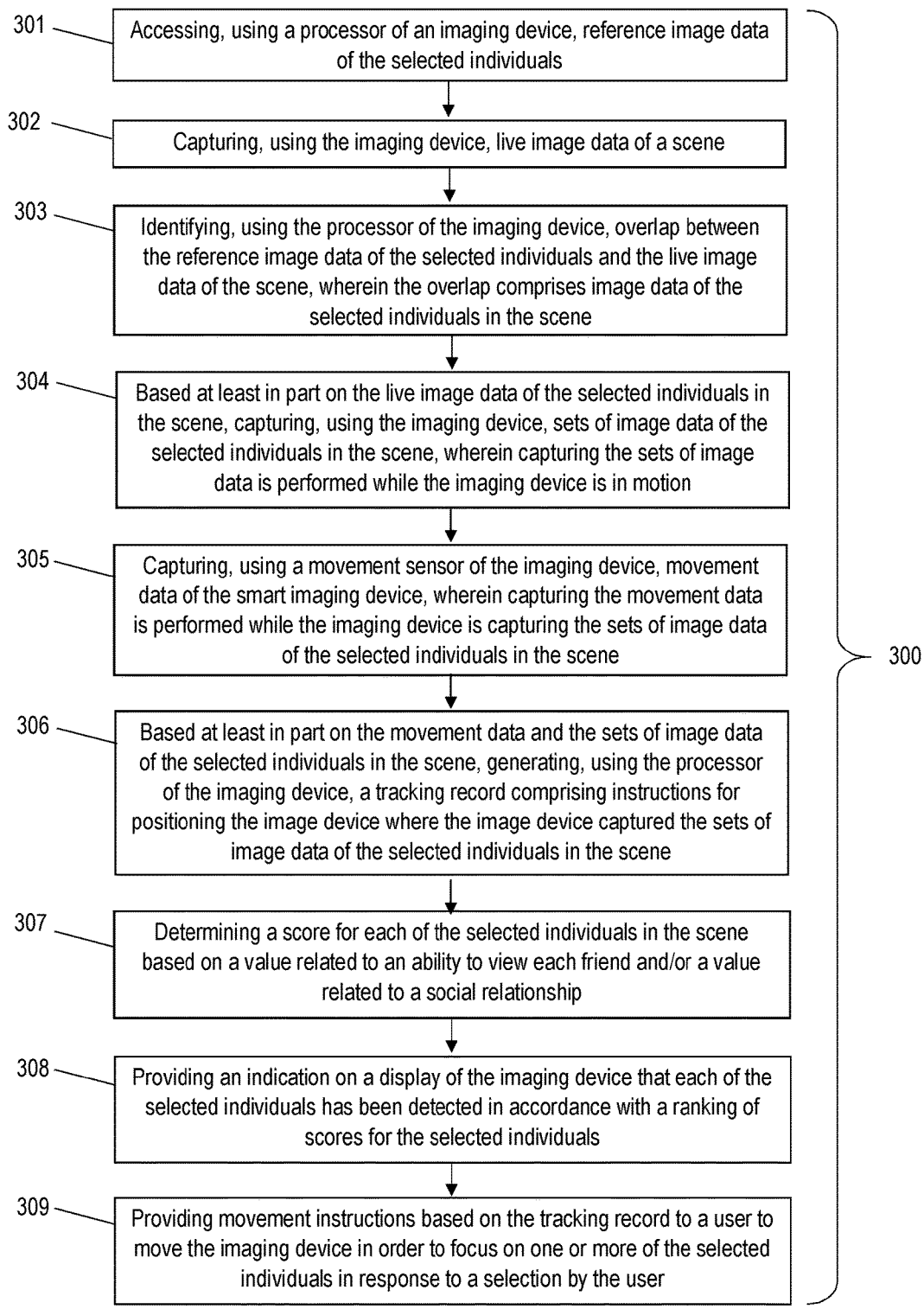
FIG. 3 depicts a flow diagram of a method for detecting friends within a field of view of a smart imaging device according to embodiments of the invention.

FIG. 3 is a flow diagram of an example embodiment of a method 300 for detecting friends with a smart imaging device. Block 301 represents accessing, using a processor of an imaging device, reference image data of the selected individuals. This block may include receiving a reference photograph or image data for each friend in a plurality of friends to provide a plurality of reference photographs or image data sets. This block may also include querying one or more social media web-sites to obtain the reference photograph for one or more friends in a plurality of friends. This block may also include downloading a file having the reference photograph for one or more friends in a plurality of friends, the downloading being performed by the user.

Block 302 represents capturing, using the imaging device, live image data of a scene. The term "live" relates to obtaining imaging data in real time with no perceptible time lag.

Block 303 represents identifying, using the processor of the imaging device, overlap between the reference image data of the selected individuals and the live image data of the scene, wherein the overlap includes image data of the selected individuals in the scene. This block can be implemented using face detection software as known in the art. Each reference photograph can be associated with a name of the person in the referenced image data such that when a face is detected in a crowd based on the referenced image data, a name can be associated with the detected face.

Block 304 represents based at least in part on the live image data of the selected individuals in the scene, capturing, using the imaging device, sets of image data of the selected individuals in the scene, wherein capturing the sets of image data is performed while the imaging device is in motion. That is, a series of images is captured while the imaging device is in motion in response to identified overlap. In one or more embodiments, the series of images can be taken based on a selected time interval between photographs. In one or more embodiments, the series of images can be taken based on the area being imaged such that there is a minimum or selected overlap between two images of adjacent areas. This block may also include automatically zooming a zoom-lens of the smart imaging device in order to provide increased image resolution capable of identifying facial features.

Block 305 represents capturing, using a movement sensor of the imaging device, movement data of the smart imaging device, wherein capturing the movement data is performed while the imaging device is capturing the sets of image data of the selected individuals in the scene.

Block 306 represents based at least in part on the movement data and the sets of image data of the selected individuals in the scene, generating, using the processor of the imaging device, a tracking record having instructions for positioning the image device where the image device captured the sets of image data of the selected individuals in the scene.

Block 307 represents determining a score for each of the selected individuals in the scene based on a value related to an ability to view each friend and/or a value related to a social relationship. In general, the easier it is to view the detected individual, the higher the score value. Similarly, the stronger a strength of the social friendship, the higher the score value. In one or more embodiments, the score includes a value for technical ease of viewing a detected individual based on the series of images, a distance from the user to the detected individual based on the series of images, and/or a strength of social friendship for the detected individual based on input from social media. Non-limiting examples of social media include Facebook and Twitter.

Block 308 represents providing an indication on a display of the imaging device that each of the selected individuals has been detected in accordance with a ranking of scores for the selected individuals. In one or more embodiments, the name of each detected individual is displayed with an indication of the ranking. In one or more embodiments, a background color or shade of color is used to indicate the ranking (e.g., from highest score value to lowest score value).

Block 309 represents providing movement instructions based on the tracking record to a user to move the imaging device in order to focus on one or more of the selected individuals in response to a selection by the user. That is, in one or more embodiments, the user inputs a selection of which detected individual the user wants the imaging device to point to. Based on the selection and the tracking record, the imaging device using a display for example provides movement instructions to the user on how to move the smart imaging device so that the smart imaging device can point to and focus on that individual. In one or more embodiments, the movement instructions backtrack the movements used to take the series of images. In one or more embodiments, the movement instructions are visual on the display (e.g., using arrows) and/or audio (e.g., voice directing the user on how to move the smart imaging device). This block may also include automatically zooming the zoom-lens in response to the user moving the imaging device in accordance with the movement instructions in order to provide sufficient resolution for viewing the selected detected friend. "Sufficient resolution" relates to having enough resolution to recognize facial features and thus visually identify the friend.

The method 300 may also include generating a zone map having a zone for each of the multiple detected individuals, where each zone has a color indication corresponding to the ranking of scores for the multiple detected individuals and displaying the zone map on the display of the smart imaging device. In one or more embodiments, a color coding for each zone may be correlated to a density of detected individuals in the corresponding zone. In one or more embodiments, the zone map captures an area surrounding each of the detected individuals showing a density of the surrounding crowd.

The methods disclosed herein have several advantages. One advantage is the ability to detect individuals or friends in a crowded environment such as in a crowded sporting event or concert. Another advantage is the ability to gage the type of friends detected and the ease at which the friends can be viewed in the crowed environment. Yet another advantage is the ability to rank the detected individuals or friends so that individuals with strong social ties to the user can be viewed before individuals having less strong social ties to the user.

Information may be required to flow between disparate applications across multiple hardware and software platforms. One architecture which supports this is Enterprise Service Bus architecture providing integrated connectivity between applications and services in a service-oriented architecture. IBM Integration Bus (formerly WebSphere Message Broker, wherein IBM and WebSphere are trademarks of International Business Machines Corporation) is an example of such an architecture, which allows business information to flow as an integration application with rules applied to the data flowing through an integration node (also referred to as a message broker) to route and transform the information.

Other architectures may include distributed computing in which a distributed system is a software system in which components are located on networked computers and communicate and coordinate their actions by passing messages. Distributed applications may be processed across a distributed computing architecture.

Figure 4:
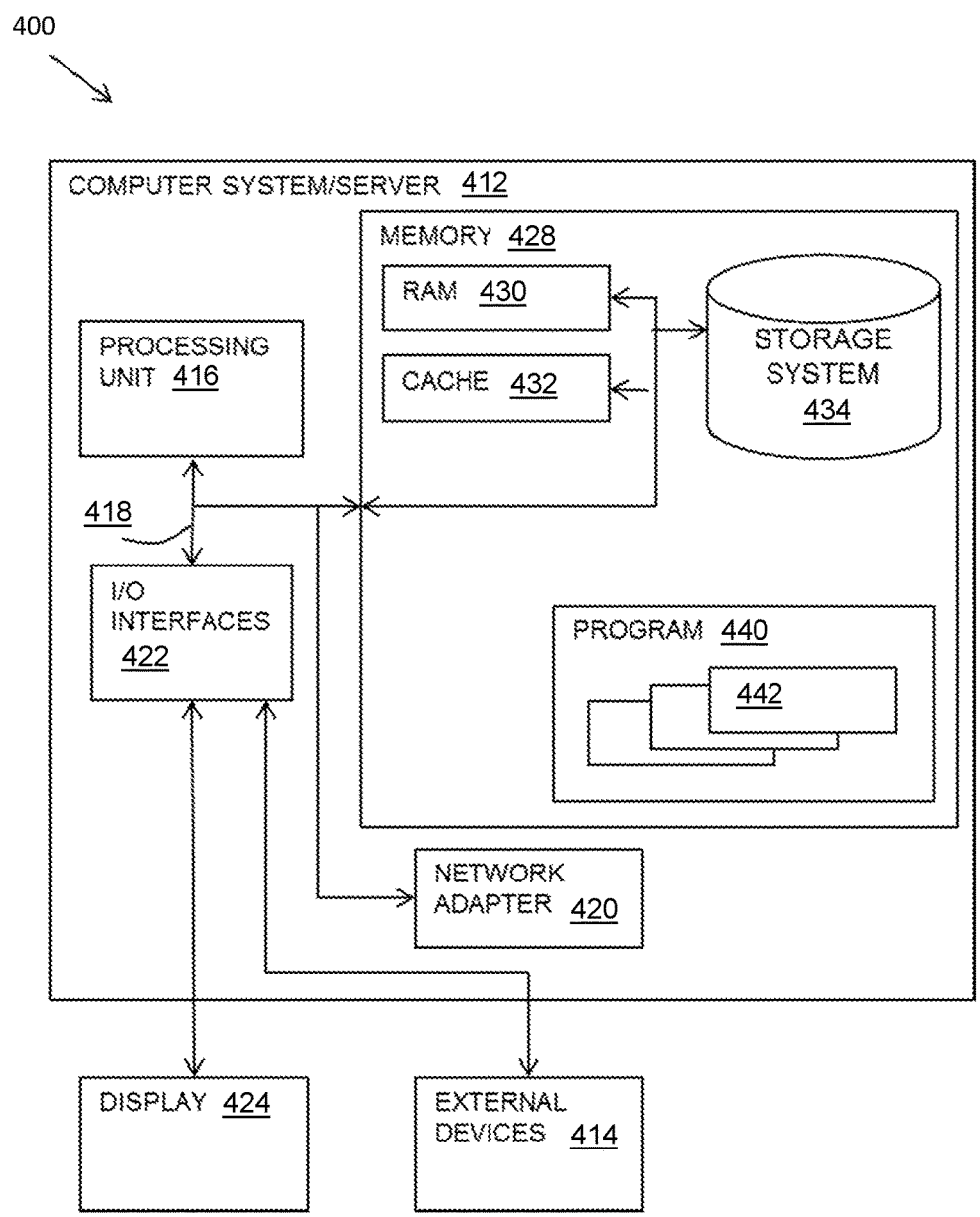
FIG. 4 depicts a block diagram of an embodiment of a computer system or cloud server capable of implementing aspects of the invention.

Referring now to FIG. 4, a schematic of an example of a system 400 in the form of a computer system or server is shown for executing the front-end software 201 and/or the back-end software 202. Some or all components of the system 600 may be included in the smart imaging device 100.

A computer system or server 412 may be operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

In FIG. 4, a computer system/server 412 is shown in the form of a general-purpose computing device. The components of the computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
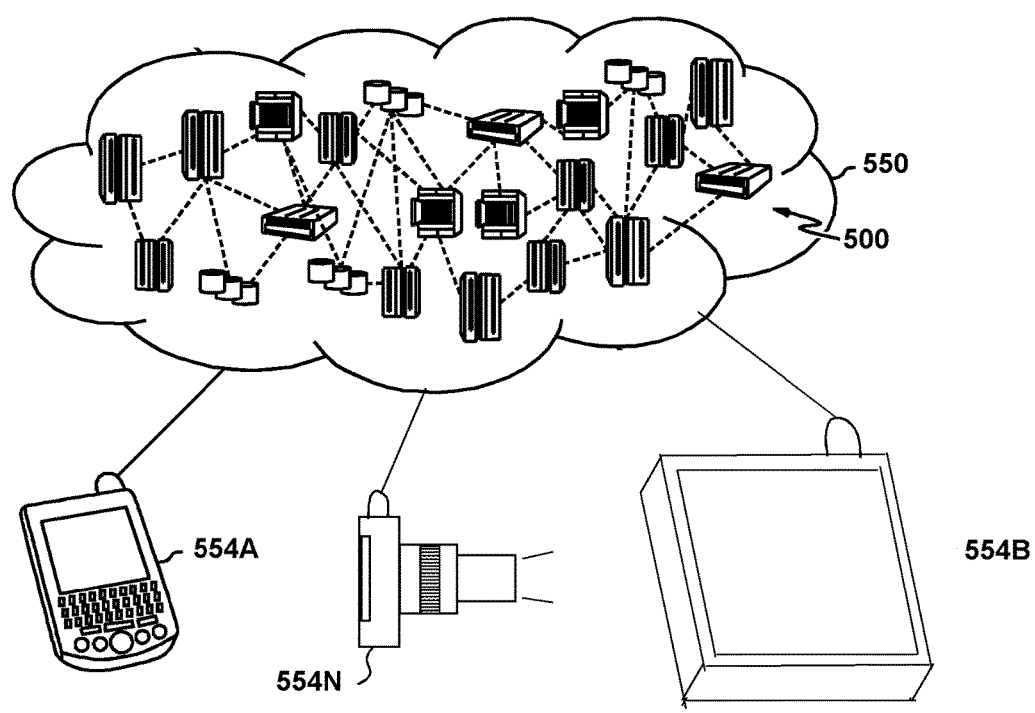
FIG. 5 depicts a schematic diagram of a cloud computing environment capable of implementing aspects of the invention.

Referring now to FIG. 5, illustrative cloud computing environment 550 is depicted. As shown, cloud computing environment 550 comprises one or more cloud computing nodes 500 with which local computing devices used by cloud consumers, such as, for example, a smart cellular telephone 554A, a smart tablet 554B, and/or a smart mobile device 554N may communicate. Nodes 500 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 54A-N shown in FIG. 5 are intended to be illustrative only and that computing nodes 500 and cloud computing environment 550 can communicate with any type of computerized device over any type of network and/or network addressable connection (e.g., using a web browser).

Figure 6:
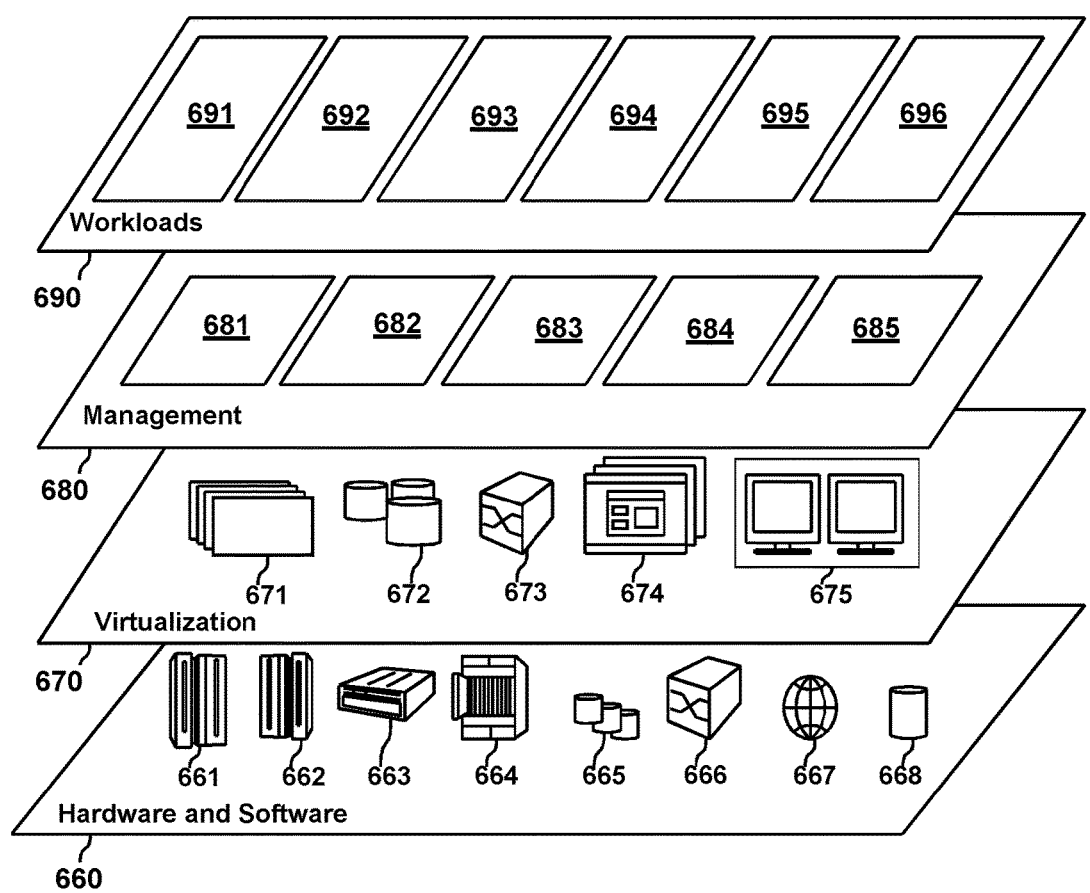
FIG. 6 depicts a diagram of abstraction model layers of a cloud computing environment capable of implementing aspects of the invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and friend-detection software 696 for finding friends using a smart imaging device. The friend-detection software 696 can represent the front-end software 201 and/or the back-end software 202.

Elements of the embodiments have been introduced with either the articles "a" or "an." The articles are intended to mean that there are one or more elements. The terms "including" and "having" and the like are intended to be inclusive such that there may be additional elements other than the elements listed. The term "configured" relates to one or more structural limitations of a device that are required for the device to perform the function or operation for which the device is configured.

The disclosure illustratively disclosed may be practiced in the absence of any element which is not specifically disclosed.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for detecting selected individuals, the method comprising:
   accessing, using a processor of an imaging device, reference image data of the selected individuals;
   capturing, using the imaging device, live image data of a scene;
   identifying, using the processor of the imaging device, overlap between the reference image data of the selected individuals and the live image data of the scene, wherein the overlap comprises image data of the selected individuals in the scene;
   based at least in part on the live image data of the selected individuals in the scene, capturing, using the imaging device, sets of image data of the selected individuals in the scene, wherein capturing the sets of image data is performed while the imaging device is in motion;
   capturing, using a movement sensor of the imaging device, movement data of the imaging device, wherein capturing the movement data is performed while the imaging device is capturing the sets of image data of the selected individuals in the scene;
   based at least in part on the movement data and the sets of image data of the selected individuals in the scene, generating, using the processor of the imaging device, a tracking record comprising instructions for positioning the imaging device where the imaging device captured the sets of image data of the selected individuals in the scene;
   providing an indication on a display of the imaging device that each of the selected individuals has been detected in accordance with a ranking of the selected individuals, the ranking being based on an ability to view each friend and/or a value related to a social relationship; and
   providing movement instructions based on the tracking record to a user to move the imaging device in order to focus on one or more of the selected individuals in response to a selection by the user.

2. The method as claimed in claim 1, further comprising determining a score for each of the selected individuals in the scene based on a value related to an ability to view each friend and/or a value related to a social relationship to provide a plurality of scores, wherein the ranking is based on a ranking of the plurality of scores.

3. The method as claimed in claim 2, wherein the score comprises a value for technical ease of viewing a detected friend based on the series of photographs, a distance from the user to the detected friend based on the series of photographs, and/or a strength of social friendship for the detected friend based on input from social media.

4. The method as claimed in claim 3, further comprising querying one or more social media web-sites to obtain social friendship information for each friend in a plurality of friends.

5. The method as claimed in claim 1, further comprising querying one or more social media web-sites to obtain the reference photograph for one or more friends in a plurality of friends.

6. The method as claimed in claim 1, further comprising downloading a file having the reference photograph for one or more friends in a plurality of friends, the downloading being performed by the user.

7. The method as claimed in claim 1, wherein taking a series of photographs comprises automatically zooming a zoom-lens of the smart imaging device in order to provide increased image resolution capable of identifying facial features.

8. The method as claimed in claim 6, further comprising automatically zooming the zoom-lens in response to the user moving the smart imaging device in accordance with the movement instructions in order to provide sufficient resolution for viewing the selected detected friend.

9. The method as claimed in claim 1, further comprising:
   generating a zone map comprising a zone for each of the multiple detected friends, each zone comprising a color indication corresponding to the ranking of scores for the multiple detected friends; and
   displaying the zone map on the display of the smart imaging device.

10. The method as claimed in claim 1, wherein at least a portion of the method is capable of being deployed in a cloud computing environment.

* * * * *